(12) United States Patent
Okudaira

(10) Patent No.: US 12,326,169 B2
(45) Date of Patent: Jun. 10, 2025

(54) GUIDE ROLLER FOR VEHICLE SLIDING DOOR

(71) Applicant: DAIDO METAL COMPANY LTD., Nagoya (JP)

(72) Inventor: Kenji Okudaira, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 185 days.

(21) Appl. No.: 18/165,954

(22) Filed: Feb. 8, 2023

(65) Prior Publication Data
US 2023/0265880 A1 Aug. 24, 2023

(30) Foreign Application Priority Data

Feb. 22, 2022 (JP) ................. 2022-026239

(51) Int. Cl.
 *F16C 13/00* (2006.01)
 *E05D 15/06* (2006.01)
 *F16C 33/58* (2006.01)
 *F16C 35/067* (2006.01)

(52) U.S. Cl.
 CPC ........ *F16C 13/006* (2013.01); *E05D 15/0665* (2013.01); *F16C 33/586* (2013.01); *F16C 35/067* (2013.01); *E05Y 2201/688* (2013.01)

(58) Field of Classification Search
 CPC .... F16C 13/006; F16C 33/586; F16C 35/067; E05D 15/0665; E05Y 2201/688
 See application file for complete search history.

(56) References Cited

U.S. PATENT DOCUMENTS

| | | | |
|---|---|---|---|
| 6,715,925 B2 * | 4/2004 | Pairone | D06F 37/00 384/537 |
| 7,895,748 B2 * | 3/2011 | Nomura | F16C 33/586 29/527.1 |
| 2012/0142468 A1 * | 6/2012 | Lescorail | F16C 35/067 384/477 |
| 2013/0047375 A1 * | 2/2013 | Miyake | C08G 12/00 528/229 |

FOREIGN PATENT DOCUMENTS

JP 2008-057568 A 3/2008

* cited by examiner

*Primary Examiner* — James Pilkington
(74) *Attorney, Agent, or Firm* — Harness, Dickey & Pierce, P.L.C.

(57) ABSTRACT

Provided is a guide roller for a vehicle sliding door. The guide roller rolls along a rail located on a vehicle body. The guide roller is pivotally supported in a rotatable manner by a support member coupled to the vehicle sliding door. The guide roller includes a ring-shaped inner race made of metal, a ring-shaped outer race, and a covering member mounted on an outer peripheral surface of the outer race.

4 Claims, 10 Drawing Sheets

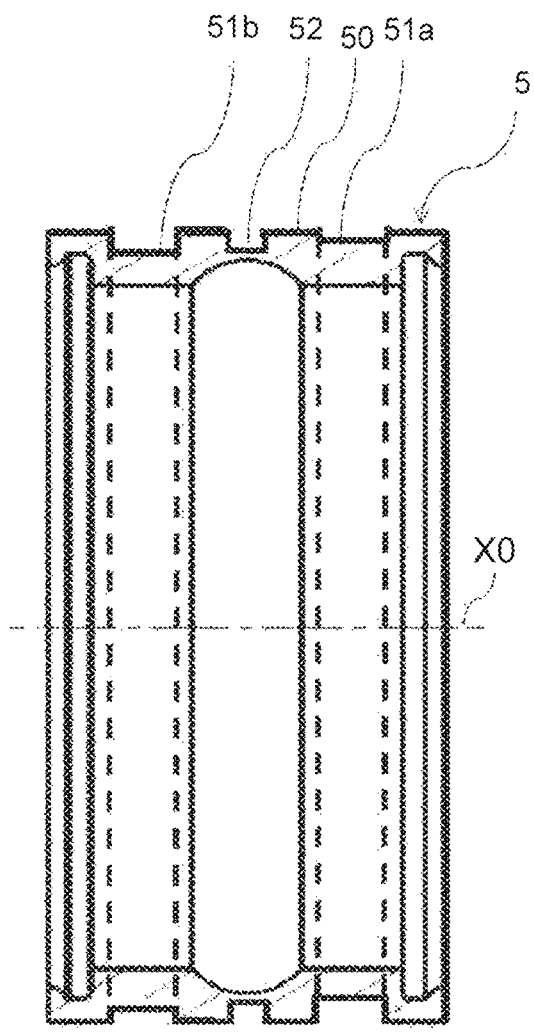

PRIOR ART

GUIDE ROLLER FOR VEHICLE SLIDING DOOR

INCORPORATION BY REFERENCE

The present application claims priority from JP Patent Application No. 2022-026239 filed on Feb. 22, 2022, the content of which is hereby incorporated by reference into this application.

BACKGROUND OF THE INVENTION

(1) Field of the Invention

The present invention relates to a guide roller for a vehicle sliding door, the guide roller rolling along a rail located on a vehicle body and being pivotally supported in a rotatable manner by a support member coupled to the sliding door.

(2) Description of Related Art

The sliding door of a vehicle is configured such that an upper guide roller, a center guide roller, and a lower guide roller are respectively caused to rollably engage with an upper rail, a center rail, and a lower rail to support the sliding door in a state of being slidable along the side wall of a vehicle body, thus allowing the sliding door to be slidably opened and closed. The upper guide roller is installed at the upper portion of the front end of the sliding door. The center guide roller is installed at the center portion of a rear end in the height direction. The lower guide roller is installed at the lower portion of the front end. The upper rail is installed at the upper edge portion of the opening portion of the vehicle body. The center rail is installed at the center portion of the side wall of the rear portion of the vehicle body in the height direction, the rear portion being adjacent to the opening portion of the vehicle body. The lower rail is installed at the lower edge portion of the opening portion of the vehicle body.

As illustrated in FIG. 11, a guide roller 21 that rolls along a guide rail is located on a vehicle body. The guide roller 21 includes an inner race 22 made of a metal, an outer race 25 made of a metal, and a covering member 27 made of a synthetic resin. The outer race 25 is rotatably mounted on the outer peripheral surface of the inner race 22 via a retainer 24 that holds bearings 23. The covering member 27 covers the outer peripheral surface of the outer race 25. With such a structure, there is no possibility of the guide rail made of a metal coming into contact with the outer race 25, and the covering member 27 comes into rolling contact with the guide rail. Accordingly, quietness at the time of opening and closing a door is improved.

When the guide roller rolls along the guide rail, there may be cases where relative sliding displacement occurs between the outer peripheral surface of the outer race 25 and the covering member 27 made of a synthetic resin about a rotation axis center X0, so that the covering member 27 made of a synthetic resin is peeled from the outer peripheral surface of the outer race 25. To prevent such peeling, a guide roller having the following configuration is proposed. As illustrated in FIG. 2 of JP-A-2008-57568, two eccentric grooves extending in the circumferential direction of the outer peripheral surface of an outer race are formed on the outer peripheral surface of the outer race such that center axes of the two eccentric grooves are eccentric in opposite directions with respect to a rotation axis, and the groove depths of the two eccentric grooves continuously vary. A covering member is joined to cover the outer peripheral surface of the outer race and the two eccentric grooves.

BRIEF SUMMARY OF THE INVENTION

In the above-proposed guide roller for a sliding door, there may be cases where a support shaft is inclined due to swing of an arm member, resulting in that the guide roller is rolled in an inclined state. In this case, the guide roller is rolled while receiving a heavy load due to contact of the upper edge of the covering member made of a resin with the surface of the guide rail. As a result, there may be cases where cracks occur in the covering member at a portion that covers, of the outer peripheral surface disposed between the two eccentric grooves, a portion in the vicinity of where one eccentric groove has the maximum groove depth and the other eccentric groove has the minimum groove depth. The reason is considered as follows. In the vicinity of where the groove depth of the one eccentric groove reaches a maximum, the covering member is elastically deformed to be pushed into the eccentric groove by a load caused by rolling of the roller and hence, the amount of elastic deformation in the direction along the outer peripheral surface of the outer race is large. In contrast, in the vicinity of where the groove depth of the other eccentric groove reaches a minimum, the eccentric groove has a narrow width and a wedge shape, thus acting as a resistance to elastic deformation and hence, the amount of elastic deformation of the covering member in the direction along the outer peripheral surface of the outer race is small. Due to such a difference in the amount of elastic deformation, large shear stress is generated in the covering member at a portion that covers, of the outer peripheral surface disposed between the two eccentric grooves, a portion in the vicinity of where the one eccentric groove has the maximum groove depth and the other eccentric groove has the minimum groove depth and hence, cracks occur in the covering member.

The present invention has been made in view of the above-mentioned circumstance, and it is an object of the present invention to provide a guide roller for a vehicle sliding door, the guide roller being capable of preventing peeling and cracks of the covering member.

To achieve the above-mentioned object, an embodiment of the invention is directed to a guide roller for a vehicle sliding door, the guide roller being configured to roll along a rail located on a vehicle body, the guide roller being pivotally supported in a rotatable manner by a support member coupled to the vehicle sliding door, the guide roller including:
 a ring-shaped inner race made of a metal;
 a ring-shaped outer race made of a metal, the outer race being rotatably mounted on an outer peripheral surface of the inner race via a retainer configured to hold a bearing; and
 a covering member made of a synthetic resin, the covering member being mounted on an outer peripheral surface of the outer race,
 wherein the outer peripheral surface of the outer race has two eccentric grooves extending in a circumferential direction, the two eccentric grooves having eccentric centers that are positioned point-symmetrically with respect to a rotation axis center of the outer race, each of the two eccentric grooves having a groove depth varying in the circumferential direction from the outer peripheral surface, wherein the two eccentric grooves are formed on the outer peripheral surface of the outer race, the two eccentric grooves being separated from each other in an axial direction of the outer race, wherein the outer race includes, on the outer peripheral surface of the outer race between the two eccentric grooves, either one of: a concentric groove; or a concentric ridge portion concentric with the rotation axis center of the outer race, the concentric ridge portion extending over an entire length in the circumferential direction, and wherein the covering member is formed to cover the outer peripheral surface of the outer race, the two eccentric grooves, and the concentric groove or the concentric ridge portion.

According to an embodiment of the present invention, the two eccentric grooves extend over the entire length of the outer peripheral surface of the outer race in the circumferential direction.

According to an embodiment of the present invention, the concentric groove or the concentric ridge portion is formed on the outer peripheral surface of the outer race at a center portion between the two eccentric grooves.

According to an embodiment of the present invention, each of the two eccentric grooves has a width varying in the circumferential direction.

BRIEF DESCRIPTION OF THE SEVERAL VIEWS OF THE DRAWING

FIG. 2A is a side view and FIG. 2B is a front view illustrating the cross section of an outer race forming the guide roller;

DETAILED DESCRIPTION OF THE INVENTION

Figure 1:
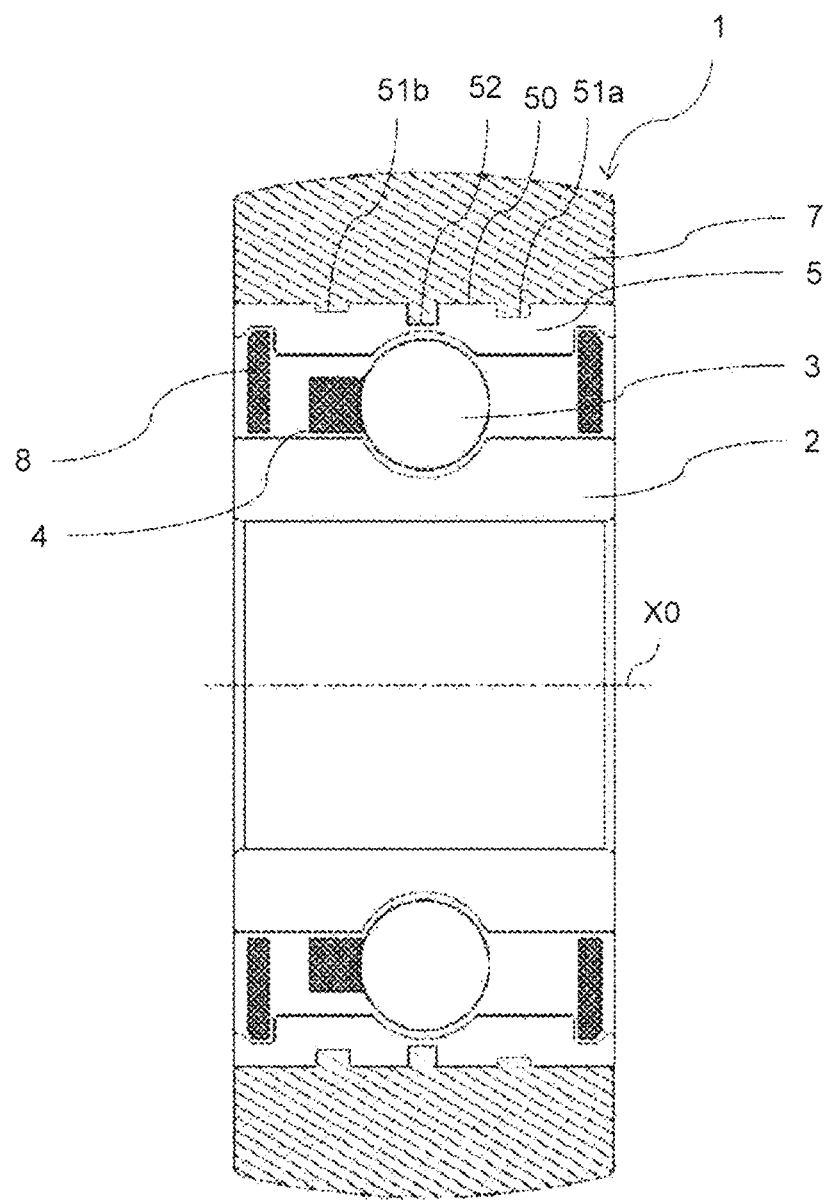
FIG. 1 is a side view illustrating the cross section of a guide roller.
Figure 2B:
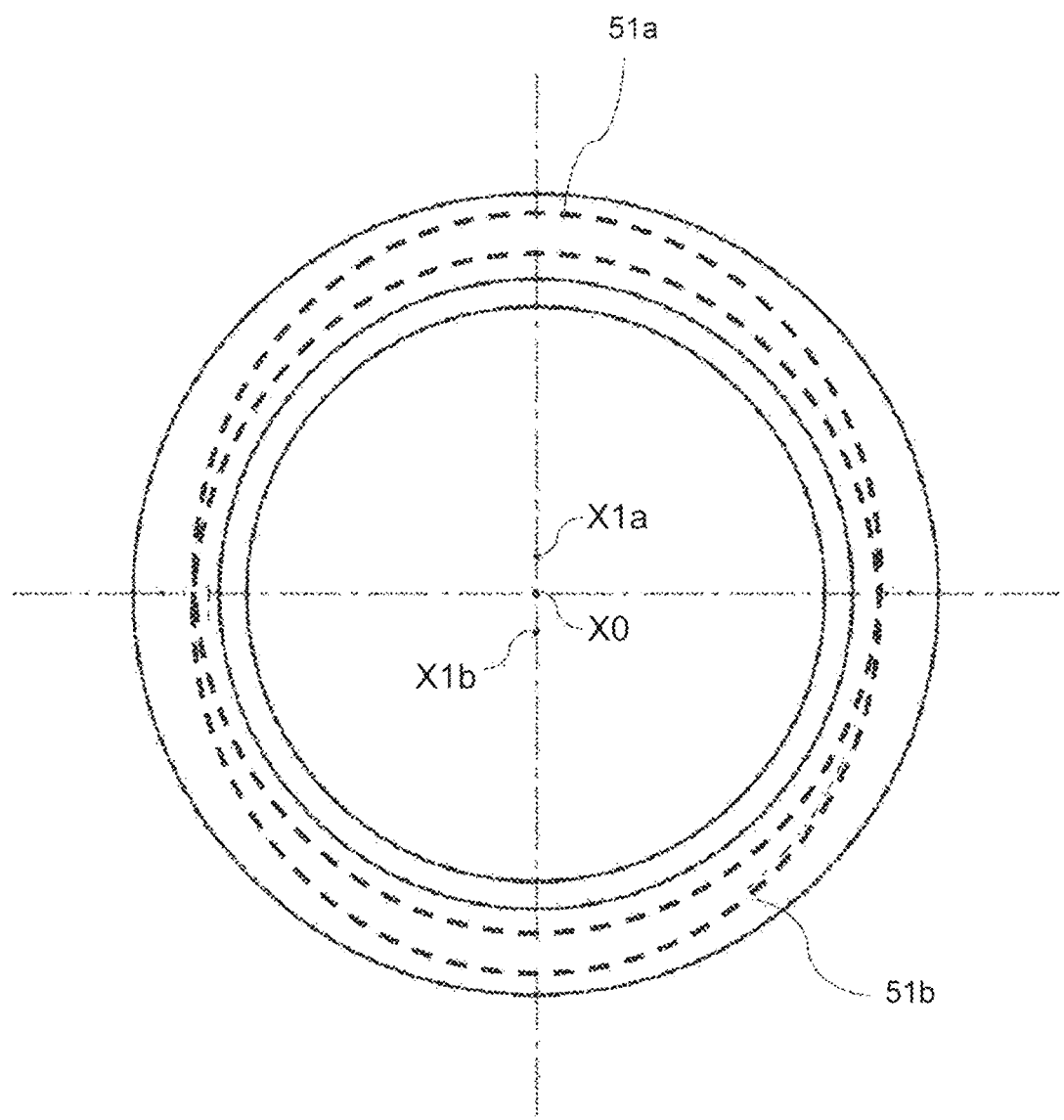
Figure 3:
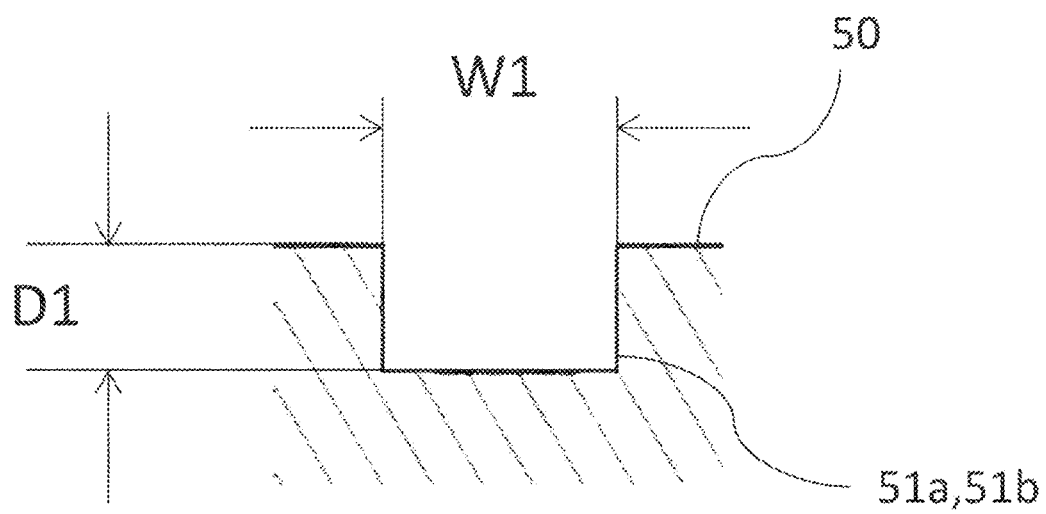
FIG. 3 is a schematic view illustrating the cross section of eccentric grooves formed on the outer race.
Figure 4:
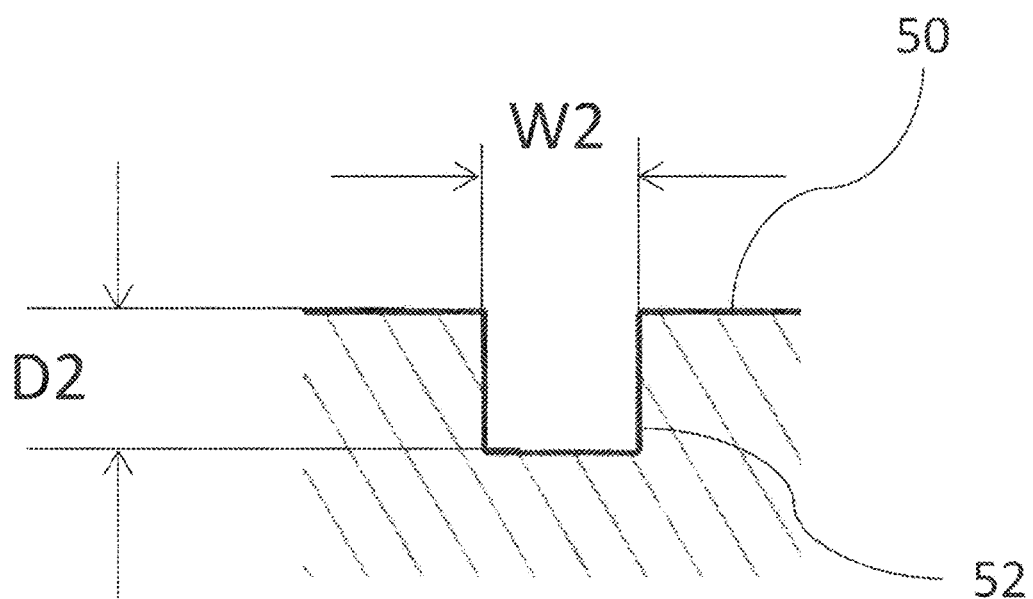
FIG. 4 is a schematic view illustrating the cross section of a concentric groove formed on the outer race.

A guide roller 1 for a vehicle sliding door according to this embodiment (first embodiment) will be described with reference to FIGS. 1 to 4. FIG. 1 is a side view illustrating the cross section of the guide roller 1. FIG. 2A is a side view and FIG. 2B is a front view each illustrating the cross section of an outer race 5 forming the guide roller 1. FIG. 3 is a schematic view illustrating the cross section of eccentric grooves 51a, 51b formed on an outer peripheral surface 50 of the outer race 5. FIG. 4 is a schematic view illustrating the cross section of a concentric groove 52 formed on the outer peripheral surface 50 of the outer race 5.

As described above, the sliding door of a vehicle is configured such that an upper guide roller, a center guide roller, and a lower guide roller are respectively caused to rollably engage with an upper rail, a center rail, and a lower rail to support the sliding door in a state of being slidable along the side wall of a vehicle body, thus allowing the sliding door to be slidably opened and closed. The upper guide roller is installed at the upper portion of the front end of the sliding door. The center guide roller is installed at the center portion of a rear end in the height direction. The lower guide roller is installed at the lower portion of the front end. The upper rail is installed at the upper edge portion of the opening portion of the vehicle body. The center rail is installed at the center portion of the side wall of the rear portion of the vehicle body in the height direction, the rear portion being adjacent to the opening portion of the vehicle body. The lower rail is installed at the lower edge portion of the opening portion of the vehicle body.

As illustrated in FIG. 1, the guide roller 1 includes an inner race 2 made of a metal and having a ring shape, the outer race 5 made of a metal and having a ring shape, a covering member 7 made of a synthetic resin, and seal rings 8. The outer race 5 is rotatably mounted on the outer peripheral surface of the inner race 2 via a retainer 4 that holds a plurality of bearings 3. The covering member 7 covers the outer peripheral surface 50 of the outer race 5. The seal rings 8 provide sealing between the outer race 5 and the inner race 2. Note that the seal rings 8 provide sealing between the outer race 5 and the inner race 2, thus having a function of preventing intrusion of foreign substances into the guide roller 1 and a function of preventing leakage of grease provided in the guide roller 1.

As illustrated in FIG. 2A, two eccentric grooves 51a, 51b are formed on the outer peripheral surface 50 of the outer race 5 in a state of being separated from each other in the axial direction of the outer race 5. Further, as illustrated in FIG. 2B, the two eccentric grooves 51a, 51b extend over the entire length of the outer peripheral surface 50 of the outer race 5 in the circumferential direction, an eccentric center X1a of the eccentric groove 51a and an eccentric center X1b of the eccentric groove 51b are point symmetrical with respect to a rotation axis center X0 of the outer race 5, and a groove depth D1 of each of the two eccentric grooves 51a, 51b in the radial direction from the outer peripheral surface 50 of the outer race 5 varies in the circumferential direction. With such a configuration, even when the guide roller 1 is rolled while receiving a heavy load due to contact of the upper edge portion of the covering member 7 with a guide rail member, relative sliding displacement is less likely to occur between the outer peripheral surface 50 of the outer race 5 and the covering member 7 about the rotation axis center X0 of the outer race 5. Accordingly, it is possible to prevent peeling of the covering member 7 from the outer peripheral surface 50 of the outer race 5.

The concentric groove 52 is formed on the outer peripheral surface 50 of the outer race 5 at the center portion between the two eccentric grooves 51a, 51b to extend inward in the radial direction from the outer peripheral surface 50. The concentric groove 52 extends over the entire length of the outer peripheral surface 50 of the outer race 5 in the circumferential direction, and is concentric with the rotation axis center X0 of the outer race 5, and a groove depth D2 of the concentric groove 52 in the radial direction from the outer peripheral surface 50 of the outer race 5 is constant over the entire length in the circumferential direction. When such a configuration is adopted, there is a large difference between the amount of elastic deformation of the covering member 7 in the vicinity of where the groove depth D1 of either one of the eccentric grooves 51a, 51b reaches a maximum and the amount of elastic deformation of the covering member 7 at an adjacent position in the vicinity of where the groove depth D1 of the other of the eccentric grooves 51a, 51b reaches a minimum. However, the outer peripheral surface 50 of the outer race 5 has the concentric groove 52 that is formed at a position between the two eccentric grooves 51a, 51b, and that extend over the entire length of the outer peripheral surface 50 of the outer race 5 in the circumferential direction. Accordingly, shear stress caused by a difference in the amount of elastic deformation is relaxed and hence, it is possible to prevent cracks of the covering member 7.

The two eccentric grooves 51a, 51b extend over the entire length of the outer peripheral surface 50 of the outer race 5 in the circumferential direction. When such a configuration is adopted, compared with a configuration in which the two eccentric grooves 51a, 51b are only partially formed in the circumferential direction of the outer peripheral surface 50 of the outer race 5, it is possible to increase an effect of causing relative sliding displacement to be less likely to occur between the outer peripheral surface 50 of the outer race 5 and the covering member 7 about the rotation axis center X0 of the outer race 5. Accordingly, it is possible to prevent peeling of the covering member 7 from the outer peripheral surface 50 of the outer race 5.

The position where the concentric groove 52 is formed is not limited to the center portion between the two eccentric grooves 51a, 51b, and may be formed on the outer peripheral surface 50 of the outer race 5 at any position between the two eccentric grooves 51a, 51b. However, when the configuration is adopted in which the concentric groove 52 is formed at the center portion between the two eccentric grooves 51a, 51b, compared with a configuration in which the concentric groove 52 is not formed at the center portion between the two eccentric grooves 51a, 51b, it is possible to increase an effect of suppressing shear stress caused by a difference in the amount of elastic deformation. Accordingly, it is possible to increase an effect of preventing cracks of the covering member 7.

As illustrated in FIG. 3, the eccentric grooves 51a, 51b are formed to have a rectangular shape in cross section. The groove depth D1 of each of the eccentric grooves 51a, 51b in the radial direction from the outer peripheral surface 50 of the outer race 5 continuously varies in the circumferential direction of the outer race 5, but a groove width W1 of each of the eccentric grooves 51a, 51b is constant over the entire length in the circumferential direction of the outer race 5. The shape of the eccentric grooves 51a, 51b in cross section is not limited to a rectangular shape, and may be another shape.

As illustrated in FIG. 4, the concentric groove 52 is formed to have a rectangular shape in cross section. The groove depth D2 of the concentric groove 52 in the radial direction from the outer peripheral surface 50 of the outer race 5 and a groove width W2 of the concentric groove 52 are each constant over the entire length in the circumferential direction of the outer race 5. The shape of the concentric groove 52 in cross section is not limited to a rectangular shape, and may be another shape.

The dimensions of this configuration may be as follows, for example. The outer diameter (diameter) of the guide roller 1 is 15 to 23 mm. The outer diameter (diameter) of the outer peripheral surface of the outer race 5 is 10 to 20 mm. The width of the guide roller 1 in the axial direction is 5 to 10 mm. A maximum groove depth D1max of each of the eccentric grooves 51a, 51b is 0.3 to 3 mm. A minimum groove depth D1min of each of the eccentric grooves 51a, 51b is 0.1 to 1 mm (however, a ratio (D1min/D1max) of the minimum groove depth D1min to the maximum groove depth D1max of the eccentric grooves 51a, 51b is 0.2 or more). The groove width W1 of each of the eccentric grooves 51a, 51b is 0.5 to 2 mm. The groove depth D2 of the concentric groove 52 is 0.1 to 2 mm. The groove width W2 of the concentric groove 52 is 1 to 4 mm. However, the dimensions of the guide roller 1 of the present invention are not limited to the dimensions described above.

For a synthetic resin used for forming the covering member 7, it is preferable to use a fiber-reinforced resin that is obtained by adding fibrous particles to a polyamide resin. However, a material used for forming the covering member 7 is not limited to the fiber-reinforced resin. The covering member 7 is made of a synthetic resin made up of a resin and an additive, and is caused to cover the outer race 5 by insert molding. In this embodiment, examples of the resin include a polyamide resin, a polyacetal resin, a polyether ether ketone resin, a polyphenylene sulfide resin, a phenol resin, an epoxy resin, a urea resin, a melamine resin, an unsaturated polyester resin, a polyimide resin, and a diallyl phthalate resin. Examples of the additive include aramid fiber, carbon fiber, molybdenum disulfide, tungsten disulfide, boron nitride, and a fluororesin.

The covering member 7 is formed to cover the outer peripheral surface 50 of the outer race 5, the eccentric grooves 51a, 51b, and the concentric groove 52, and to have a curvature with which the covering member 7 has the largest outer diameter in the vicinity of the center in the axial direction of the outer race 5.

A Fe alloy, such as bearing steel (SUJ-2), may be used for the inner race 2 and the outer race 5. Induction hardening is applied to the track portions of the inner race 2 and the outer race 5. Accordingly, the inner race 2 can be easily fixed to a support shaft (not illustrated in the drawing) by caulking, and the inner race 2 and the outer race 5 can be formed to have durability against wear due to friction between the inner race 2/outer race 5 and the bearings 3.

In this embodiment, the outer peripheral surface 50 of the outer race 5 (except for the eccentric grooves 51a, 51b and the concentric groove 52) has a flat shape. However, the shape of the outer peripheral surface 50 of the outer race 5 is not limited to such a shape. The outer peripheral surface 50 may be formed to have one curved surface or a plurality of curved surfaces.

Figure 5:
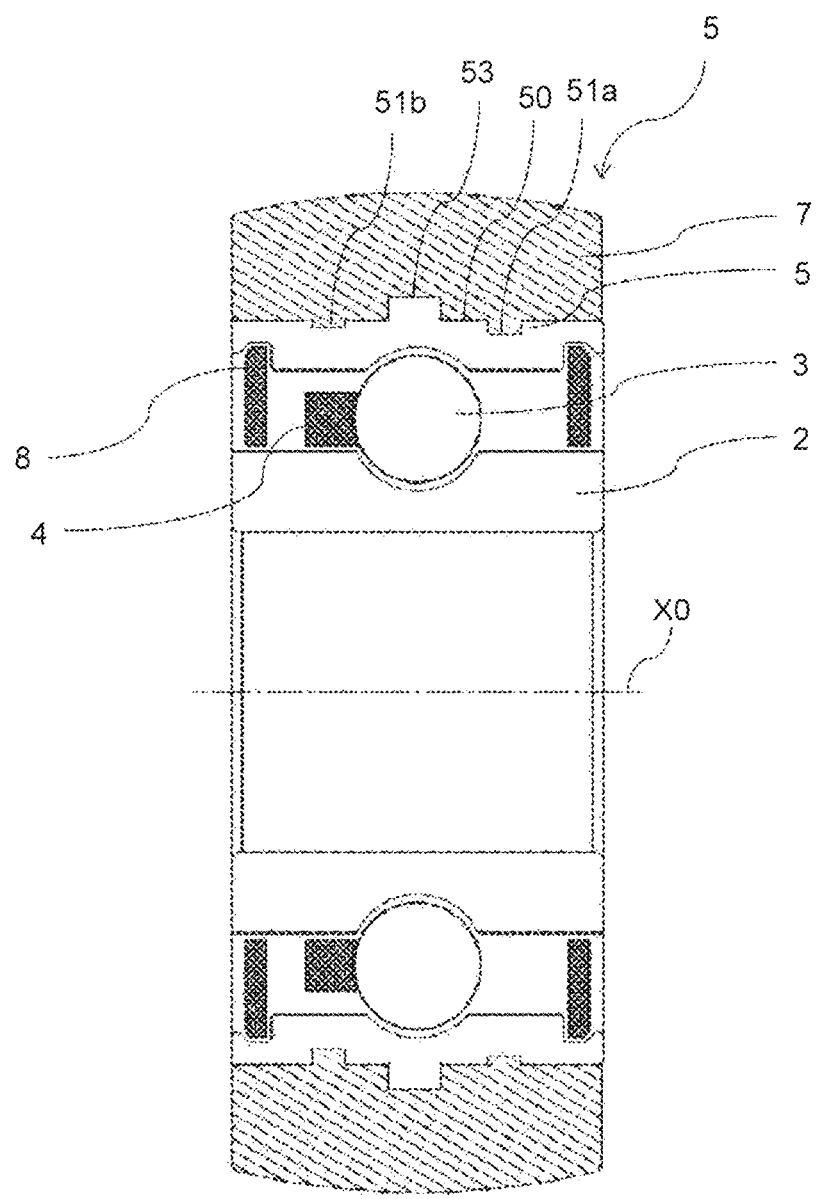
FIG. 5 is a side view illustrating the cross section of a guide roller of a second embodiment.
Figure 6:
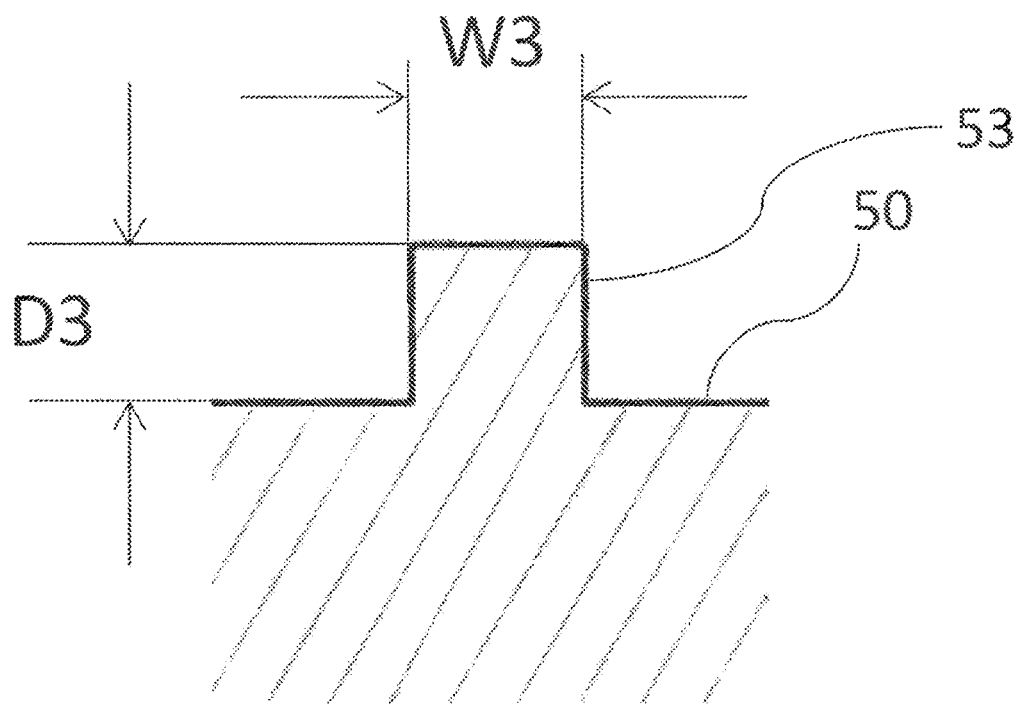
FIG. 6 is a schematic view illustrating the cross section of a concentric ridge portion formed on an outer race.

Next, a guide roller 1 for a vehicle sliding door according to a second embodiment will be described with reference to FIG. 5 and FIG. 6. FIG. 5 is a side view illustrating the cross section of the guide roller 1 of the second embodiment. FIG. 6 is a schematic view illustrating the cross section of a concentric ridge portion 53 formed on an outer peripheral surface 50 of an outer race 5. The guide roller 1 of the second embodiment differs from the guide roller 1 of the first embodiment only with respect to a configuration in which the concentric ridge portion 53 is formed on the outer peripheral surface 50 of the outer race 5 in place of the concentric groove 52.

As illustrated in FIG. 5, the concentric ridge portion 53 is formed on the outer peripheral surface 50 of the outer race 5 at the center portion between two eccentric grooves 51a, 51b to extend outward in the radial direction from the outer peripheral surface 50. The concentric ridge portion 53 extends over the entire length of the outer peripheral surface 50 of the outer race 5 in the circumferential direction, and is concentric with a rotation axis center X0 of the outer race 5, and a height D3 of the concentric ridge portion 53 in the radial direction from the outer peripheral surface 50 of the outer race 5 is constant over the entire length in the circumferential direction. When such a configuration is adopted, there is a large difference between the amount of elastic deformation of the covering member 7 in the vicinity of where a groove depth D1 of either one of the eccentric grooves 51a, 51b reaches a maximum and the amount of elastic deformation of the covering member 7 at an adjacent position in the vicinity of where the groove depth D1 of the other of the eccentric grooves 51a, 51b reaches a minimum. However, the outer peripheral surface 50 of the outer race 5 has the concentric ridge portion 53 that is formed at a position between the two eccentric grooves 51a, 51b, and that extends over the entire length of the outer peripheral surface 50 of the outer race 5 in the circumferential direction. Accordingly, shear stress caused by a difference in the amount of elastic deformation is relaxed and hence, it is possible to prevent cracks of the covering member 7.

The position where the concentric ridge portion 53 is formed is not limited to the center portion between the two eccentric grooves 51a, 51b, and may be formed on the outer peripheral surface 50 of the outer race 5 at any position between the two eccentric grooves 51a, 51b. However, the configuration in which the concentric ridge portion 53 is formed at the center portion between the two eccentric grooves 51a, 51b, rather than a configuration in which the concentric ridge portion 53 is not formed at the center portion between the two eccentric grooves 51a, 51b, can effectively suppress the shear stress caused by a difference in the amount of elastic deformation, thus effectively preventing cracks of the covering member 7.

As illustrated in FIG. 6, the concentric ridge portion 53 is formed to have a rectangular shape in cross section. The height D3 of the concentric ridge portion 53 in the radial direction from the outer peripheral surface 50 of the outer race 5 and a groove width W3 of the concentric ridge portion 53 are constant over the entire length in the circumferential direction of the outer race 5. The shape of the concentric ridge portion 53 in cross section is not limited to a rectangular shape, and may be another shape.

The dimensions of this configuration may be, for example, as follows: the height D3 of the concentric ridge portion 53 is 0.1 to 2 mm; and the groove width W3 of the concentric ridge portion 53 is 1 to 4 mm. However, the height D3 of the concentric ridge portion 53 and the groove width W3 of the concentric ridge portion 53 are not limited to the dimensions described above.

Figure 7:
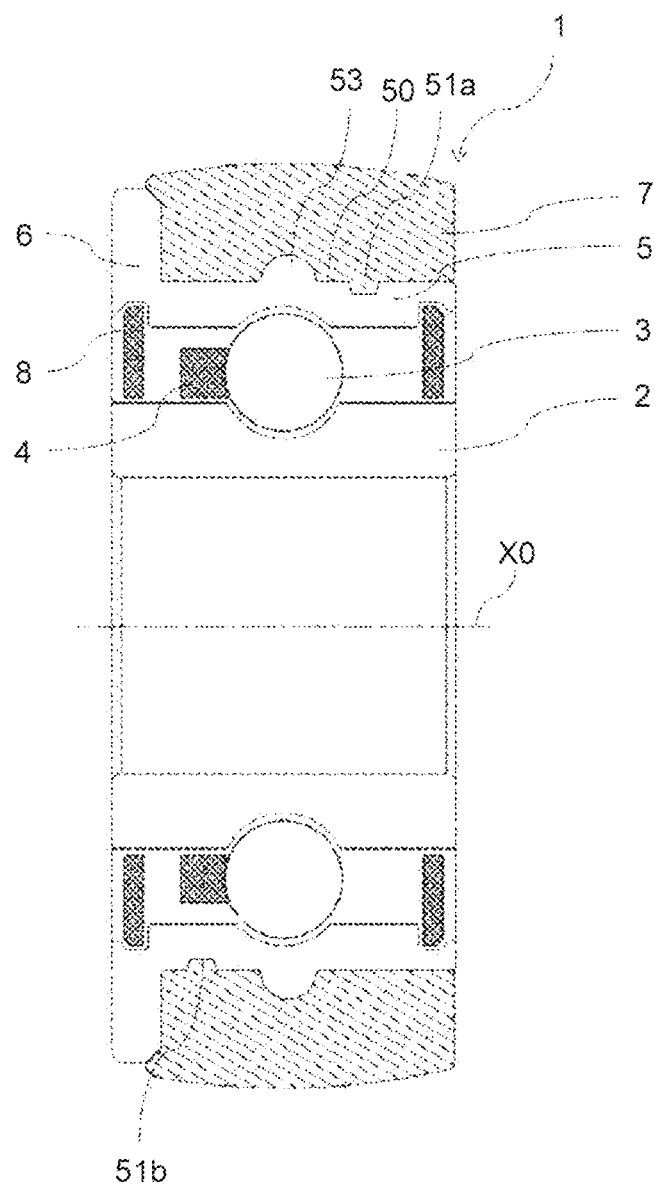
FIG. 7 is a side view illustrating the cross section of a guide roller of a third embodiment.
Figure 8A:
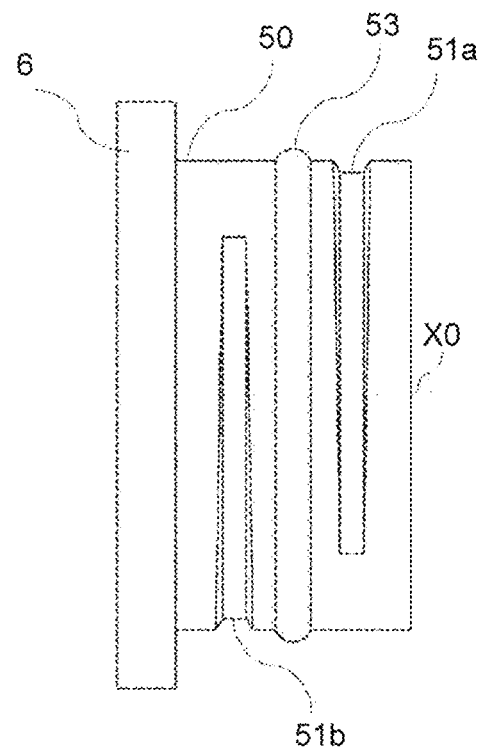
FIG. 8A is a side view and FIG. 8B is a front view of an outer race forming the guide roller of the third embodiment.
Figure 8B:
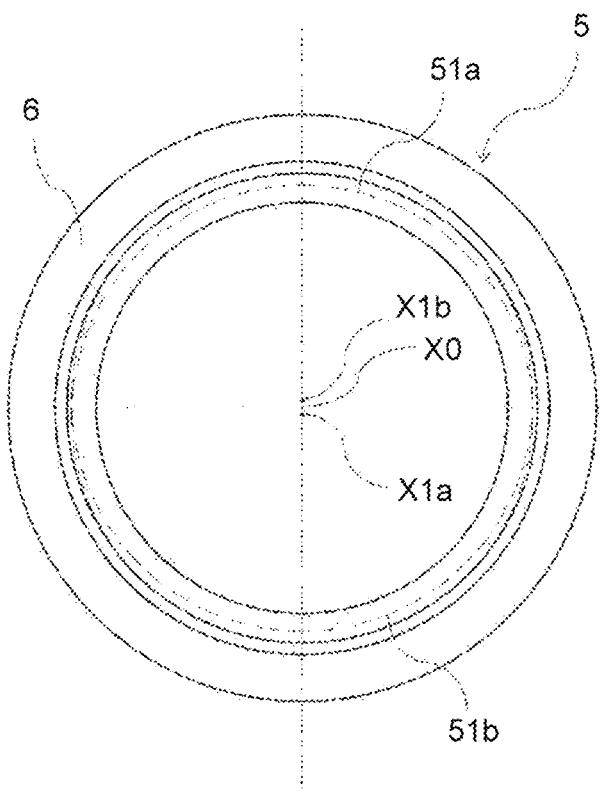
Figure 9:
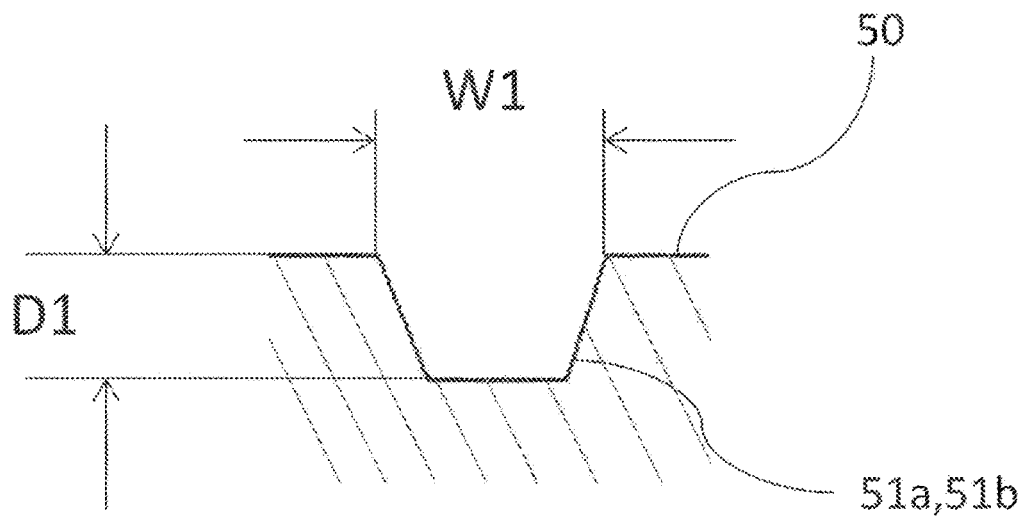
FIG. 9 is a schematic view illustrating the cross section of an eccentric groove formed on the outer race.
Figure 10:
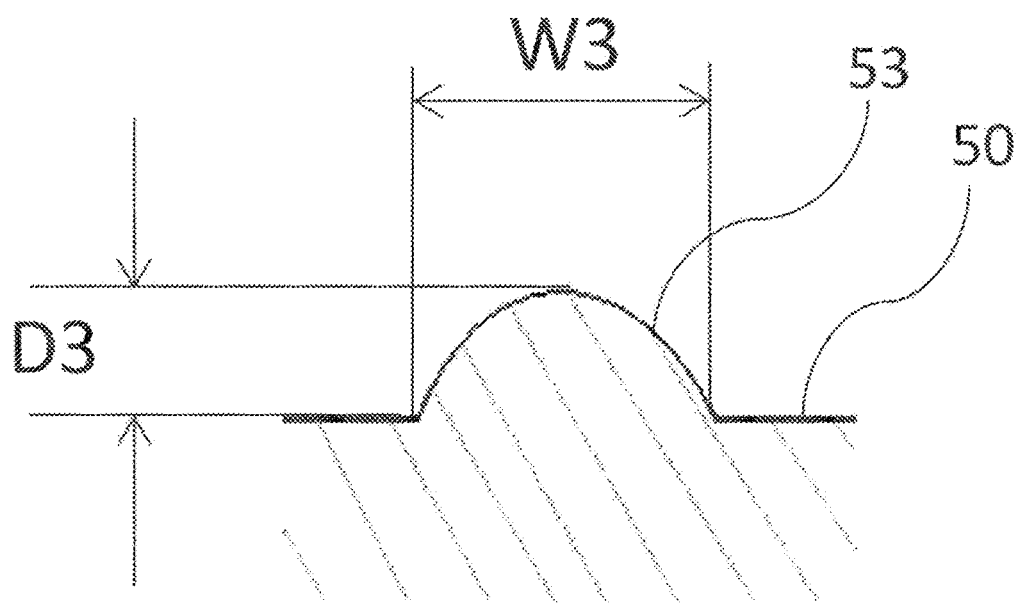
FIG. 10 is a schematic view illustrating the cross section of a concentric ridge portion formed on the outer race.
Figure 11:
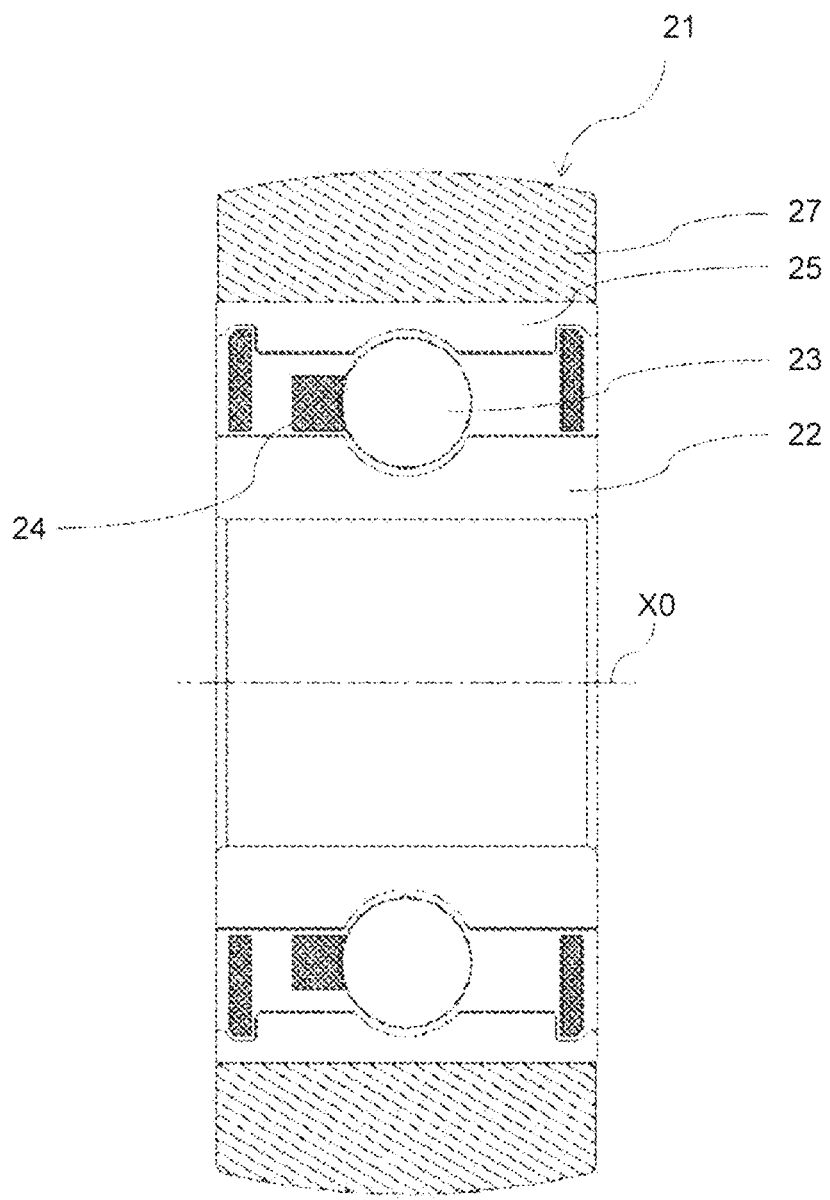
FIG. 11 is a side view illustrating the cross section of a conventional guide roller.

Next, a guide roller 1 for a vehicle sliding door according to a third embodiment will be described with reference to FIGS. 7 to 10. FIG. 7 is a side view illustrating the cross section of the guide roller 1 of the third embodiment. FIG. 8A is a side view and FIG. 8B is a front view of an outer race 5 forming the guide roller 1. FIG. 9 is a schematic view illustrating the cross section of eccentric grooves 51a, 51b formed on an outer peripheral surface 50 of the outer race 5. FIG. 10 is a schematic view illustrating the cross section of a concentric ridge portion 53 formed on the outer peripheral surface 50 of the outer race 5. The guide roller 1 of the third embodiment differs from the guide roller 1 of the first embodiment with respect to the shape of the eccentric grooves 51a, 51b formed on the outer race 5, a configuration in which the concentric ridge portion 53 is formed on the outer peripheral surface 50 of the outer race 5 in place of the concentric groove 52, and a configuration in which a flange portion 6 is provided that extends outward in the radial direction from one end portion of the outer peripheral surface 50 of the outer race 5 in the axial direction.

As illustrated in FIG. 8A, the two eccentric grooves 51a, 51b are formed on the outer peripheral surface 50 of the outer race 5 in a state of being separated from each other in the axial direction of the outer race 5. Further, as illustrated in FIG. 8B, the two eccentric grooves 51a, 51b extend in the circumferential direction of the outer peripheral surface 50 of the outer race 5, an eccentric center X1a of the eccentric groove 51a and an eccentric center X1b of the eccentric groove 51b are point symmetrical with respect to a rotation axis center X0 of the outer race 5, and lengths of the two eccentric grooves 51a, 51b in the circumferential direction (ranges where the two eccentric grooves 51a, 51b are formed on the outer peripheral surface 50 of the outer race 5) are smaller than the entire length of the outer peripheral surface 50 of the outer race 5 in the circumferential direction. It is preferable that the lengths of the eccentric grooves 51a, 51b in the circumferential direction be set to lengths that correspond to a circumferential angle of 300° or more on the outer peripheral surface 50 of the outer race 5.

As illustrated in FIG. 9, the eccentric grooves 51a, 51b are formed to have an inverted trapezoidal shape in cross section. A groove depth D1 of each of the eccentric grooves 51a, 51b in the radial direction from the outer peripheral surface 50 of the outer race 5 and a groove width W1 of each of the eccentric grooves 51a, 51b continuously vary in the circumferential direction of the outer race 5. When such a configuration is adopted in which the groove width W1 of each of the eccentric grooves 51a, 51b varies in the circumferential direction of the outer race 5, compared with a configuration in which the groove width W1 of each of the eccentric grooves 51a, 51b is constant in the circumferential direction of the outer race 5, it is possible to increase an effect of causing relative sliding displacement to be less likely to occur between the outer peripheral surface 50 of the outer race 5 and the covering member 7 about the rotation axis center X0 of the outer race 5 and hence, it is possible to prevent peeling of the covering member 7 from the outer peripheral surface 50 of the outer race 5. The shape of the eccentric grooves 51a, 51b in cross section is not limited to an inverted trapezoidal shape, and may be another shape.

As illustrated in FIG. 7, the concentric ridge portion 53 is formed on the outer peripheral surface 50 of the outer race 5 at the center portion between the two eccentric grooves 51a, 51b to extend outward in the radial direction from the outer peripheral surface 50. The concentric ridge portion 53 extends over the entire length of the outer peripheral surface 50 of the outer race 5 in the circumferential direction, and is concentric with the rotation axis center X0 of the outer race 5, and a height D3 of the concentric ridge portion 53 in the radial direction from the outer peripheral surface 50 of the outer race 5 is constant over the entire length in the circumferential direction.

As illustrated in FIG. 10, the concentric ridge portion 53 is formed to have an arc shape in cross section. The height D3 of the concentric ridge portion 53 in the radial direction from the outer peripheral surface 50 of the outer race 5 and a groove width W3 of the concentric ridge portion 53 are each constant over the entire length in the circumferential direction of the outer race 5.

The outer race 5 also includes the flange portion 6 that extends outward in the radial direction from the one end portion of the outer peripheral surface 50 in the axial direction, and the covering member 7 is formed to cover the outer peripheral surface 50 of the outer race 5, the eccentric grooves 51a, 51b, the concentric ridge portion 53, and the inner side surface of the flange portion 6 in the axial direction. When such a configuration is adopted, the covering member 7 also comes into contact with the inner side surface of the flange portion 6 of the outer race 5 and hence, the covering member 7 is joined to the outer race 5 more firmly. In this embodiment, the flange portion 6 of the outer race 5 is formed to extend in a direction perpendicular to the axial direction. However, the extending direction of the flange portion 6 is not limited to such a direction. For example, the flange portion 6 of the outer race 5 may be formed to extend outward in the axial direction of the outer race 5 from the outer peripheral surface 50 in an inclined manner.

The guide roller 1 of the present invention described above is used for a vehicle sliding door, and may be used for any one of the upper rail, the center rail, and the lower rail, the upper rail being installed at the upper edge portion of the opening portion of the vehicle body, the center rail being installed at the center portion of the side wall of the rear portion of the vehicle body in the height direction, the rear portion being adjacent to the opening portion of the vehicle body, the lower rail being installed at the lower edge portion of the opening portion of the vehicle body.

The invention claimed is:

1. A guide roller for a vehicle sliding door, the guide roller being configured to roll along a rail located on a vehicle body, the guide roller being pivotally supported in a rotatable manner by a support member coupled to the vehicle sliding door, the guide roller comprising:
 a ring-shaped inner race made of a metal;
 a ring-shaped outer race made of a metal, the outer race being rotatably mounted on an outer peripheral surface of the inner race via a retainer configured to hold a bearing; and
 a covering member made of a synthetic resin, the covering member being mounted on an outer peripheral surface of the outer race,
 wherein the outer peripheral surface of the outer race has two eccentric grooves extending in a circumferential direction, the two eccentric grooves having eccentric centers that are positioned point-symmetrically with respect to a rotation axis center of the outer race, each of the two eccentric grooves having a groove depth varying in the circumferential direction from the outer peripheral surface,
 wherein the two eccentric grooves are separated from each other in an axial direction of the outer race,
 wherein the outer race includes, on the outer peripheral surface of the outer race between the two eccentric grooves, a concentric groove concentric with the rotation axis center of the outer race, and
 wherein the covering member is formed to cover the outer peripheral surface of the outer race, the two eccentric grooves, and the concentric groove-or the concentric ridge portion.

2. The guide roller according to claim 1, wherein the two eccentric grooves extend over the entire length of the outer peripheral surface of the outer race in the circumferential direction.

3. The guide roller according to claim 1, wherein the concentric groove is formed on the outer peripheral surface of the outer race at a center portion between the two eccentric grooves.

4. The guide roller according to claim 1, wherein each of the two eccentric grooves has a width varying in the circumferential direction.

* * * * *